United States Patent Office 2,817,650
Patented Dec. 24, 1957

2,817,650
PROCESS FOR RAISING THE MELTING POINT OF ACETONE-SOLUBLE COPOLYMERS

Marshall W. Duke, Midland, Mich., assignor to The Dow Chemical Company, Midland, Mich., a corporation of Delaware No Drawing. Application July 11, 1956
Serial No. 597,090

5 Claims. (Cl. 260—85.5)

This invention relates to a novel process for raising the melting point of certain acetone-soluble copolymers. More particularly it relates to such a process for raising the melting point of acetone-soluble copolymers composed of vinylidene chloride and acrylonitrile.

In U. S. 2,681,325 are disclosed certain copolymers of vinylidene chloride and acrylonitrile which are soluble in acetone in concentrations necessary for spinning continuous fibers and filaments and for casting continuous films. Those copolymers contain from 30 to 55 percent acrylonitrile and correspondingly from 70 to 45 percent vinylidene chloride. The acetone spinning dopes prepared with those polymers could be spun by either wet or dry spinning techniques, and the fibers so prepared were found to have in interesting family of properties for commercial use. Those fibers had one serious drawback, however. They had a softening range or melting point that was so low that the fabrics woven from the fibers could not be ironed. Attempts were made to raise the melting point of the fibers by increasing the molecular weight of the copolymer. Other attempts involved the preparation of a more homogeneous copolymer by special polymerization techniques. Those attempts as well as all others either failed to raise the melting point of the fibers or destroyed the acetone solubility of the copolymer. It would be desirable to have a process for preparing acetone-soluble copolymers composed of vinylidene chloride and acrylonitrile having higher melting points than the prior copolymers and the provision of such a process is the principal object of this invention.

Other objects will be apparent as the description of the invention proceeds.

It has now been found that the melting point of articles prepared from acetone soluble copolymers of vinylidene chloride and acrylonitrile is raised without destroying the acetone solubility by preparing an acetone dope comprising the copolymer, and an acetone soluble agent selected from the group consisting of monoalkyl phosphites, dialkyl phosphites, monoalkyl phosphates, and dialkyl phosphates and fabricating the dope into an article which is substantially acetone free.

The copolymers useful in the process of this invention are those described in U. S. 2,681,325 as containing from 30 to 55 percent by weight of acrylonitrile and correspondingly from 70 to 45 percent by weight of vinylidene chloride. Optimum results are obtained when the copolymer is one of 40 percent by weight of acrylonitrile and 60 percent vinylidene chloride. For use in continuous articles such as fibers and films the copolymers should have a molecular weight which would give a solution viscosity of at least 1.5 centipoises and not to exceed 2.5 centipoises when measured from a solution of 0.5 gram of the copolymer dissolved in 100 milliliters of dimethyl formamide at 25° C. Preferably the viscosity as thus measured should be between 1.8 to 2.2 centipoises.

The acetone-soluble agent is selected from the group consisting of mono- and dialkyl phosphites and the mono- and dialkyl phosphates. Typical examples of useful agents are mono-n-butyl phosphate, mono-n-octyl phosphate, mono-ethyl phosphite, dimethyl phosphite, and diethyl phosphite. It is essenial that at least one and not more than two of the acidic hydrogens of the partially esterified acid of phosphorus be present. Phosphoric acid causes the copolymer to become insoluble and a trialkyl phosphate has no effect in raising the melting point of the fibers and films.

For casting films and spinning fibers it is desirable to have a solution of from 10 to 20 percent by weight of the defined copolymer in acetone, and solutions of that concentration range may be easily prepared by stirring the polymer into the acetone at room temperature. Less stirring is needed when the acetone is warmed to 35° to 45° C. Following dissolution of the copolymer in the acetone the phosphorus compound may be dissolved in the dope. The order of dissolution of the copolymer and modifier is not critical, and, if desired, the phosphorus compound may be dissolved first, followed by the copolymer, or the dissolution of the ingredients may be carried out simultaneously.

To achieve the stated objectives of the process of this invention of raising the melting point of the article without sacrificing acetone solubility, the phosphorus compound should be employed in an amount of from 1 to 5 percent of the weight of the copolymer. When less than 1 percent is used there is very little if any elevation of the melting point, while the use of more than 5 percent can cause insolubility of the product.

Following preparation of the dope, a continuous article is fabricated by casting a film or by wet or dry spinning fibers. The articles are then air dried or subjected to moderate temperatures to remove any readily volatile matter, after which the articles are subjected to an elevated temperature for a short time to cause chemical reaction between the copolymer and the phosphorus compound and to fuse or to sinter the article. For example, exposure of an article to a temperature of about 150° C. for from 15 to 60 minutes will suffice. Temperatures of 150° to 200° C. are most useful.

The inventor believes that the elevation in melting point without loss of acetone solubility is due principally to a minor amount of cross-linking of the copolymer chains. Fibers, fabrics and films produced in accordance with this process are capable of being ironed at the usual temperatures used for ironing synthetic fibers and the fabrics produced therefrom. If desired, an acetone insoluble product may be prepared by using greater than the stated amounts of agent and subjecting the formed article to elevated temperatures for prolonged periods.

By way of illustration, several dopes were prepared from 240 parts by weight of anhydrous acetone, 57 parts by weight of a copolymer composed of 60 percent vinylidene chloride and 40 percent acrylonitrile, and 3 parts by weight of several phosphorus containing agents. For comparative purposes, one dope had no phosphorus containing agent, one used ortho-phosphoric acid, and one used triethyl phosphate. Each of the dopes was cast onto a stainless steel plate to a dry thickness of 0.0025 inch. The wet cast films were air dried for 24 hours followed by an oven drying for one hour at 55° C. to remove substantially all of the acetone. The dried films were then heated at 150° C. for up to 60 minutes after which strips of the films ⅛ inch wide were cut for determining an apparent melting point and solubility. The apparent melting point is a melting point under a low load, and often provides a sharp point for many polymeric materials which soften over a range of temperatures and show no true melting point. The determination was made by weighing one end of the film strip equivalent to 1400 gms./cm.$^2$ of cross-section. The other end of the strip was clamped so that the weighted end hung free. A variable resistance cylindrical heating element was placed so as to contact about 0.5 inch of the film. The heating element was brought to 175° C. before mounting the strip. The temperature was then raised until the film strip either melted and broke or until 300° C. was reached. If the film had not melted at 300° C. it was considered to have been adequately cross-linked.

Acetone solubility was determined by immersing the strips in acetone for one hour at room temperature. The strips were then examined visually and rated arbitrarily as soluble, partially soluble, and insoluble.

The results are listed in Table I.

*Table I*

| Phosphorus Agent | Apparent melting point (°C.) | Acetone Solubility |
|---|---|---|
| Mono-n-butyl phosphate | 300 | partially soluble. |
| mono-n-octyl phosphate | 300 | soluble. |
| monoethyl phosphate | 300 | Do. |
| diethyl phosphite | 300 | Do. |
| dimethyl phosphite | 300 | Do. |
| For comparison: | | |
| none | 199 | Do. |
| phosphoric acid | 300 | insoluble. |
| triethyl phosphate | 185 | partially soluble. |

It can be seen that the melting points of the films prepared in accordance with this invention are at least 100° C. higher than the blank which contained no agent.

When the heat solubility of the film strips are compared it was found that the strips of this invention were at least as stable as the blank, i. e., they showed no more, and often less evidence of discoloration after prolonged thermal exposure.

The invention has been illustrated by tests carried out on film strips. It is equally applicable to the improvement in thermal properties of filamentary products made from the acetone solutions of the copolymers and phosphorus compounds.

I claim:

1. A process for increasing the melting point of acetone soluble copolymers of vinylidene chloride without destroying acetone solubility comprising sequentially preparing an acetone solution of a copolymer composed of from 30 to 55 percent by weight of acrylonitrile and correspondingly from 70 to 45 percent by weight of vinylidene chloride and from 1 to 5 percent of the weight of said copolymer of an acetone-soluble phosphorus containing agent selected from the group consisting of mono-alkyl phosphites, dialkyl phosphites, mono-alkyl phosphates and dialkyl phosphates, removing acetone from the solution, and finally subjecting the acetone-free composition to an elevated temperature until the melting point of the copolymer has been raised.

2. The process claimed in claim 1, wherein said acetone solution contains from 10 to 20 percent by weight of said copolymer.

3. The process claimed in claim 1, wherein said copolymer is composed of 40 percent by weight of acrylonitrile and 60 percent by weight of vinylidene chloride.

4. The process claimed in claim 1, wherein said elevated temperature is at least 150° C.

5. The process claimed in claim 1, wherein the solution of copolymer and phosphorus compound is spun in filamentary form and the resulting product is freed from acetone and heated to a temperature of 150° to 200° C.

References Cited in the file of this patent

UNITED STATES PATENTS 2,587,477    Hunter _____ Feb. 26, 1952